United States Patent
Lee et al.

(10) Patent No.: US 11,988,829 B2
(45) Date of Patent: May 21, 2024

(54) WAVEGUIDE TYPE DISPLAY APPARATUS

(71) Applicant: SAMSUNG ELECTRONICS CO., LTD., Suwon-si (KR)

(72) Inventors: Changkun Lee, Seoul (KR); Seokil Moon, Suwon-si (KR); Geeyoung Sung, Daegu (KR); Bongsu Shin, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 320 days.

(21) Appl. No.: 17/370,667

(22) Filed: Jul. 8, 2021

(65) Prior Publication Data

US 2022/0187599 A1    Jun. 16, 2022

(30) Foreign Application Priority Data

Dec. 15, 2020   (KR) ........................ 10-2020-0175833

(51) Int. Cl.
| | |
|---|---|
| G02B 27/01 | (2006.01) |
| F21V 8/00 | (2006.01) |
| G02B 1/00 | (2006.01) |
| G02B 5/00 | (2006.01) |
| G02B 5/32 | (2006.01) |

(52) U.S. Cl.
CPC .......... *G02B 27/0101* (2013.01); *G02B 1/002* (2013.01); *G02B 5/003* (2013.01); *G02B 5/32* (2013.01); *G02B 6/0026* (2013.01); *G02B 6/005* (2013.01)

(58) Field of Classification Search
CPC .... G02B 27/0101; G02B 1/002; G02B 5/003; G02B 5/32; G02B 6/0026; G02B 6/005

USPC .......................................................... 349/11
See application file for complete search history.

(56) References Cited

U.S. PATENT DOCUMENTS

| | | |
|---|---|---|
| 5,224,198 A | 6/1993 | Jachimowicz et al. |
| 2015/0365577 A1 | 12/2015 | Watnik et al. |
| 2016/0055822 A1 | 2/2016 | Bell |
| 2019/0094551 A1 | 3/2019 | Yaras et al. |
| 2019/0212557 A1 | 7/2019 | Waldern et al. |
| 2020/0057304 A1 | 2/2020 | Lu et al. |
| 2021/0149208 A1 | 5/2021 | Putilin et al. |
| 2021/0191129 A1 | 6/2021 | Lee et al. |
| 2022/0091323 A1* | 3/2022 | Yaroshchuk ........ G02B 6/29304 |
| 2023/0213767 A1* | 7/2023 | Grant ..................... G02B 6/005 |
| | | 345/8 |

FOREIGN PATENT DOCUMENTS

| | | |
|---|---|---|
| KR | 10-2021-0081211 A | 7/2021 |
| WO | 2019195193 A1 | 10/2019 |

OTHER PUBLICATIONS

Communication dated Mar. 3, 2022 issued by the European Patent Office in European Application No. 21191776.0.

* cited by examiner

*Primary Examiner* — Charles S Chang
(74) *Attorney, Agent, or Firm* — Sughrue Mion, PLLC

(57) ABSTRACT

A waveguide type display apparatus is provided. This waveguide type display apparatus includes a waveguide through which an image proceeds and a leakage image reducer configured to reduce emission of a leakage image leaked from the waveguide without total internal reflection in the waveguide, from among images, to the outside by a volume grating.

23 Claims, 9 Drawing Sheets

WAVEGUIDE TYPE DISPLAY APPARATUS

CROSS-REFERENCE TO RELATED APPLICATION

This application is based on and claims priority under 35 U.S.C. § 119 to Korean Patent Application No. 10-2020-0175833, filed on Dec. 15, 2020, in the Korean Intellectual Property Office, the disclosure of which is incorporated by reference herein in its entirety.

BACKGROUND

1. Field

Example embodiments of the present disclosure relate to waveguide type display apparatuses, and more particularly, to waveguide type display apparatuses capable of reducing an image output to the outside.

2. Description of Related Art

Virtual reality is a technology that enables a human to experience a real-life like feeling in a virtual world created by a computer. Augmented reality is a technology that allows a virtual image to be mixed with a physical environment or space of the real world. A virtual reality display or a near-eye display in which an augmented reality display is implemented reproduces a virtual image in a space by using a combination of optical and stereoscopic images. In such a near-eye display, display resolution and processing are important.

The near-eye display apparatus uses a very thin waveguide and a diffractive optical element that arbitrarily directs image information of a light source, and therefore the near-eye display apparatus may be realized in a small volume. In additional to the diffractive optical element being very thin, the diffractive optical element may have a photoselectivity that reacts only to light incident at a specific angle and wavelength. The diffractive optical element may be used for an augmented reality display by being designed to transmit light of an actual object as it is and to react only to light that has traveled into the waveguide by utilizing these characteristics.

Also, in a display apparatus that uses a waveguide and a diffractive optical element, light diffracted to a higher order term by the diffractive optical element may be output to the outside through a surface of the waveguide, resulting in noise emission. That is, the light diffracted to a higher order term by the diffractive optical element may be output in a direction different from an eye of the user wearing the display apparatus. Such noise is a design impediment factor, and since an observer located outside may view an image of a user wearing the display apparatus, a case of invasion of privacy may occur.

SUMMARY

Example embodiments provide waveguide-type display apparatuses that reduce leakage images, that is, noise, leaking from a waveguide to the outside.

Additional aspects will be set forth in part in the description which follows and, in part, will be apparent from the description, or may be learned by practice of the example embodiments of the disclosure.

According to an aspect of the disclosure, there is provided a waveguide type display apparatus comprising: a first waveguide; a first coupler provided on the first waveguide and configured to input light corresponding to an image into the first waveguide; a second coupler provided on the first waveguide and configured to output the light propagating through the first waveguide to outside of the first waveguide; and an optical element comprising a volume grating configured to reduce leakage light, among the light propagating through the first waveguide, which exits the first waveguide without total internal reflection.

The optical element maybe further configured to transmit light incident from a real environment.

The optical element maybe provided on a first region of the first waveguide that is different from a second region on which the first coupler is provided and a third region on which the second coupler is provided.

The leakage light may have a diffraction order greater than or equal to 2 and the leakage light is generated by diffraction by at least one of the first coupler and the second coupler of the light propagating through the first waveguide.

The optical element may comprise a deflection element configured to deflect light at an deflection angle greater than an incident angle of the leakage light by at least a portion of the volume grating based on the leakage light being incident on the volume grating.

The optical element may further comprise a second waveguide provided parallel to the first waveguide, and wherein light deflected from the deflection element maybe totally internally reflected and propagated in the second waveguide.

The deflection element maybe provided between the first waveguide and the second waveguide.

The deflection element may have a first refractive index that is less than a second refractive index of the first waveguide and less than a third refractive index of the second waveguide.

The first waveguide, the second waveguide, and the deflection element maybe sequentially arranged.

The deflection element may comprise a first deflection element and a second deflection element, and wherein the second waveguide maybe provided between the first deflection element and the second deflection element.

The optical element may further comprise a light absorber provided on the second waveguide.

The light absorber maybe an absorbance of about 80% or more.

The light absorber maybe provided on at least one end of the second waveguide.

Light deflected by the deflection element may enter and propagate in the first waveguide by total internal reflection.

The optical element may further comprise a light absorber provided on the first waveguide.

The deflection element may comprise a holographic optical element in which the volume grating is formed by interference between reference light and signal light, and wherein the deflection element maybe configured to output the signal light that reacted to the leakage light, among a plurality of signal light recorded in the deflection element.

The deflection element may comprises a meta-material in which the volume grating is formed as a nanostructure array having a dimension less than a wavelength of the leakage light and which changes a direction of the leakage light.

The optical element may comprises: a first optical element configured to reduce leakage of light having a first optical characteristic among the leakage light to the outside; and a second optical element configured to reduce leakage of light having a second optical characteristic among the leakage light to the outside, wherein the optical element is further configured to reduce leakage of light having a third optical characteristic among the leakage light to the outside.

The first optical characteristic, the second optical characteristic, and the third optical characteristic correspond to different wavelengths.

The light having the first optical characteristic is red light, the light having the second optical characteristic is green light, and the light having the third optical characteristic is blue light.

The waveguide type display apparatus may further comprise a third coupler provided on the optical element, wherein the third coupler may be configured to make the leakage light to be reincident onto the first waveguide.

The waveguide type display apparatus may further comprise an imaging device configured to provide the image to the first coupler.

The waveguide type display apparatus is a near-eye display apparatus.

According to another aspect of the disclosure, there is provided a display device comprising: a communication circuit configured to receive a command signal from an external device; a display configured to output an image based on the command signal; a first waveguide configured to receive and propagate input light corresponding to the image; and an optical element configured to reduce leakage light, among the light propagating through the first waveguide, which exits the first waveguide without total internal reflection.

According to another aspect of the disclosure, there is provided a display system comprising: a first device comprising: a display configured to output an image; a first waveguide configured to receive and propagate input light corresponding to the image; and an optical element configured to reduce leakage light, among the light propagating through the first waveguide, which exits the first waveguide without total internal reflection; and a second device comprising a processor configured output a command to control the display to output the image.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
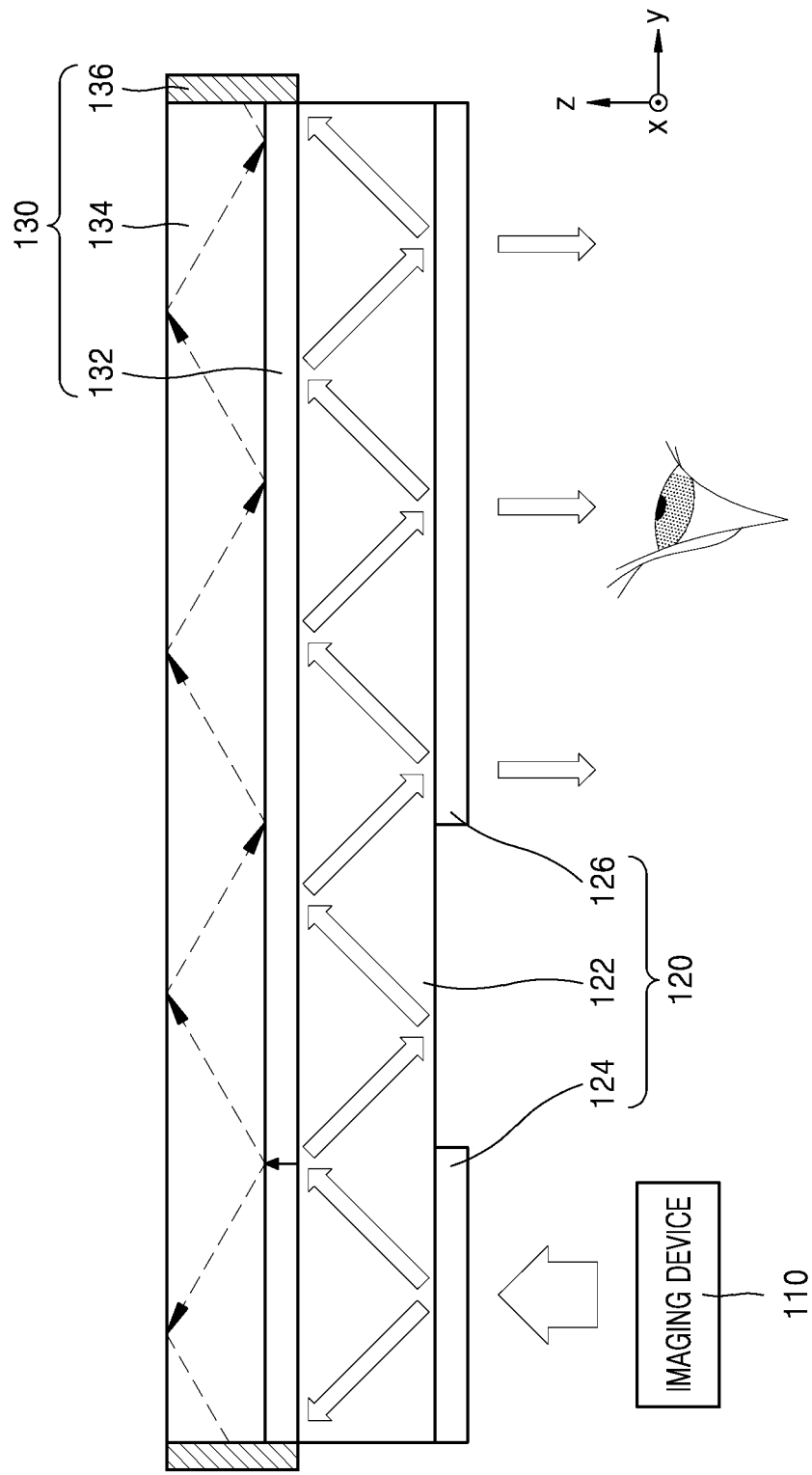
FIG. 1 is a schematic diagram of a waveguide type display apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereafter, the inventive concept will be described more fully with reference to the accompanying drawings, in which example embodiments of the inventive concept are shown. The embodiments of the inventive concept are only to materialize the inventive concept and should not restrict the scope of right or limit the inventive concept. Example embodiments that are readily inferred from the detailed descriptions and embodiments of the inventive concept by those of ordinary skill in the art will be construed as being included in the inventive concept.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included. Also, in the specification, the term "units" or " . . . modules" denote units or modules that process at least one function or operation, and may be realized by hardware, software, or a combination of hardware and software.

It should be understood that, in the disclosure, although the terms 'first', 'second', etc. may be used herein to describe various constituent elements, these constituent elements should not be limited by these terms. These terms are only used to distinguish one constituent element from another.

When a position of an element is described using an expression "above" or "on", the position of the element may include not only the element being "immediately on/under/left/right in a contact manner" but also being "on/under/left/right in a non-contact manner". Reference will now be made in detail to embodiments, examples of which are illustrated in the accompanying drawings.

FIG. 1 is a schematic diagram of a waveguide type display apparatus 100 according to an example embodiment. The waveguide type display apparatus 100 may be a near-eye display apparatus.

Referring to FIG. 1, the waveguide type display apparatus 100 may include an imaging device 110 that provides an image and an optical coupler 120 that combines the image provided from the imaging device 110 and light generated in a real environment. The image may be light provided by the imaging device 110.

The imaging device 110 may include a light source that provides an image. The imaging device 110 may output an image according to an electrical signal. The imaging device 110 may include, for example, a liquid crystal display (LCD), Liquid Crystal on Silicon (LCoS), an organic light-emitting diode (OLED) display, a light-emitting diode (LED) display, etc.

The optical coupler 120 may include a first waveguide 122 that propagates an image through total internal reflection and transmits light with respect to an external environment, an input coupler 124 that inputs or passes an image from the imaging device 110 into the first waveguide 122, and an output coupler 126 that outputs an image traveling through the first waveguide 122 to the outside of the first waveguide 122.

The first waveguide 122 may propagate an image through total reflection. The first waveguide 122 may include a transparent member, for example, glass or a transparent plastic material.

An image incident on the input coupler 124 is diffracted by the input coupler 124 and enters and travels inside the first waveguide 122 along a length direction of the first waveguide 122, for example, a y-direction. The image may be vertically or obliquely incident on the input coupler 124. The input coupler 124 may be a diffractive optical element or a holographic optical element that diffracts an incident image.

When an image advanced through the first waveguide 122 enters the output coupler 126, the image is output to eyes of a user outside the first waveguide 122. Like the input coupler 124, the output coupler 126 may be a diffractive optical element or a deflection element 132 that diffracts an incident image.

Meanwhile, some of the images diffracted by the input coupler 124 and incident to the first waveguide 122 may not be totally internally reflected in the first waveguide 122 and may be output to the outside through a surface of the first waveguide 122. For instance, the light incident on the output coupler 126 may be diffracted and entered into the user's eyes. However, some of the light may be diffracted, travel in a direction different to the user's eyes, and output to the outside through the surface of the first waveguide 122. For instance, some of the light may be diffracted, travel in a direction opposite to the user's eyes, and output to the outside through the surface of the first waveguide 122 at a side opposite to the user's eyes. Light traveling in a direction opposite to the user's eyes may be a higher-order term, for example, diffracted light of a second or higher order.

The light output from the first waveguide 122 in a direction opposite to the user's eyes may be referred to as a leakage image because it contains image information. An observer other than the user may observe the leakage image. Since a leakage image includes various polarization states, wavelengths, and direction components, it is difficult to prevent the leakage image from outputting to the outside.

The waveguide type display apparatus 100 according to an example embodiment may further include a leakage image reducer 130 that reduces the output of a leakage image to the outside by being transmitted through a surface of the first waveguide 122. The leakage image reducer 130 may prevent the leakage image from being output to the outside, and also, transmit light incident from the outside, that is, a real environment. The leakage image reducer 130 may be provided on a region of the first waveguide 122 where the input coupler 124 and the output coupler 126 are not arranged.

The leakage image reducer 130 may include a deflection element 132 configured to output light at an output angle greater than an incident angle of the leakage image, a second waveguide 134 that propagates light output from the deflection element 132 by total internal reflection, and a light absorber 136 configured to absorb light traveled from the second waveguide 134.

The deflection element 132 may be arranged between the first waveguide 122 and the second waveguide 134. The deflection element 132 may have a refractive index less than the refractive index of the first and second waveguides 134. Thus, the first waveguide 122 and the second waveguide 134 may be configured to totally internally reflected light and propagate the light.

When a leakage image or light from the first waveguide 122 is incident on the deflection element 132, the deflection element 132 may output the light into the second wave guide 134 at an output angle greater than an incident angle of the leakage image. The deflection element 132 may include a holographic optical element, a meta-material, a polarizing plate, etc. Light output from the deflection element 132 may be a leakage image itself, or may be a signal light that reacts to the leakage image among signal lights recorded in the deflection element 132. The deflection element 132 outputs light at an output angle greater than an incident angle, and hereinafter, the light output from the deflection element 132 may be referred to as deflected light.

The second waveguide 134 may be arranged parallel to the first waveguide 122. The surface of the first waveguide 122 may be divided into an first surface facing the user's eye and a second surface facing a direction different from the user's eye, the second waveguide 134 may be arranged on an external surface of the first waveguide 122. For example, the surface of the first waveguide 122 may have an inner surface facing the user's eye and an outer surface facing the outside, and the second waveguide 134 may be arranged on the outer surface of the first waveguide 122. According to an example embodiment, similar to the first waveguide 122, the second waveguide 134 may include a transparent member, for example, glass or a transparent plastic material. Light output from the deflection element 132 may be totally internally reflected in the second waveguide 134 and may move to the end of the second waveguide 134.

The light absorber 136 may be arranged at least one end of both ends of the second waveguide 134. Light that has traveled through the second waveguide 134 is absorbed by the light absorber 136 and disappears, thus, the outputting of a leakage image to the outside may be prevented. According to an example embodiment, the absorbance rate of the light absorber 136 may be 80% or more. The light absorber 136 may include a black matrix material, a resin polymer, etc., but the disclosure is not limited thereto. Therefore, according to another example embodiment, the absorbance rate of the light absorber 136 may be different and the material of the light absorber 136 may be different.

The deflection element 132 may include a holographic optical element in which reference light and signal light are formed in a volume grating. Among signal lights recorded on the holographic optical element, a signal light that reacts to the leakage image may be output. The signal light may be output from the holographic optical element at an output angle greater than an incident angle of a leakage image so that the signal light may be totally internally reflected in second waveguide 134.

The wavelength selectivity and angle selectivity of the holographic optical element may be controlled according to thickness and refractive index of a material included in the holographic optical element. The holographic optical element may include a non-volatile material. For example, the holographic optical element may include at least one of a photopolymer and an inorganic crystal. The holographic optical element may have a thickness in a range from about 1 mm to about 10 mm. For example, about 500 signal lights may be recorded as reference light having a bandwidth of about 0.1 nm in a photopolymer having a thickness of about 3 mm, and about 500 signal lights may be recorded as reference light having a bandwidth of about 0.05 nm in a photopolymer having a thickness of about 5 mm.

Figure 2:
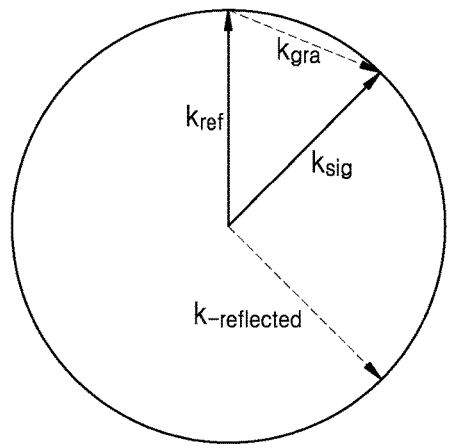
FIG. 2 is a diagram illustrating a k-diagram of a holographic optical element according to an example embodiment.

FIG. 2 is a diagram illustrating a k-diagram of a holographic optical element according to an example embodiment. Reference light and signal light may be recorded on the holographic optical element to satisfy a grating condition as shown in FIG. 2. In FIG. 2, $K_{ref}$ denotes a traveling direction of reference light and $K_{sig}$ denotes a traveling direction of signal light. When the reference light and the signal light are recorded together in the holographic optical element, a volume grating may be formed in a $K_{gra}$ direction in the holographic optical element.

When a leakage image is incident on the holographic optical element on which the volume grating is formed, a signal light that reacted to the leakage image among signal lights previously recorded on the holographic optical element may be output. Here, the signal light that reacted to the leakage image denotes a signal light recorded together with the same reference light as the leakage image.

On the other hand, when a traveling direction of light traveling at a critical angle satisfying a total internal reflection condition in the second waveguide 134 is referred to as $K\text{-}_{reflected}$, it is preferable that the direction $K_{gra}$ of the volume grating and the direction $K\text{-}_{reflected}$ of the light traveling at the critical angle may be parallel to each other so that the light to be totally reflected does not reaches the holographic optical element.

In the holographic optical element according to an example embodiment, a volume grating may be formed in advance by using reference light and signal light. While the reference light may vary according to light characteristics and incidence angle of the leakage image, the signal light corresponding to each reference light may have an output angle at which the signal light may be total reflected in the second waveguide 134. In addition, the optical characteristics of the signal light may vary according to the optical characteristics of the reference light, or may have one optical characteristic regardless of the optical characteristics of the reference light.

Figure 3A:
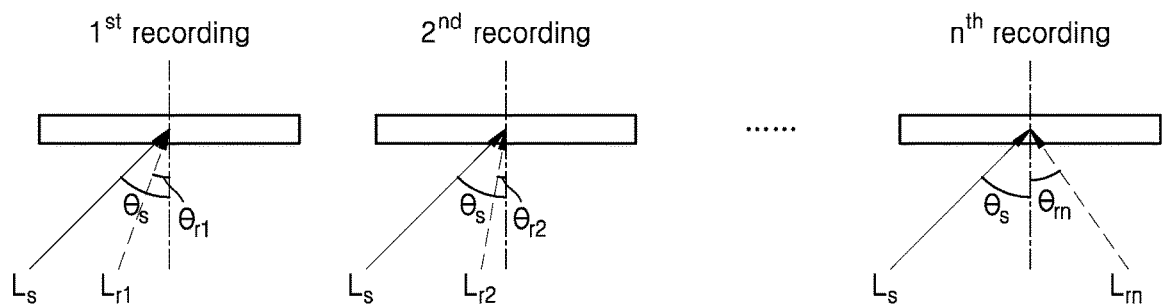
FIG. 3A is a reference diagram illustrating a method of recording reference light and signal light in a holographic optical element according to an example embodiment.

FIG. 3A is a reference diagram illustrating a method of recording reference light and signal light in a holographic optical element according to an example embodiment. Referring to FIG. 3A, signal light may be recorded in the holographic optical element HOE by using reference light having the same light characteristics and incident angle as the leakage image. The signal light $L_s$ may be irradiated to the holographic optical element HOE in a state that first reference light $L_{r1}$ is irradiated with a first incident angle $\theta_{r1}$. An incident angle $\theta_s$ of the signal light $L_s$ may be greater than the first incident angle $\theta_{r1}$ of the first reference light $L_{r1}$. Then, the first reference light $L_{r1}$ and the signal light $L_s$ are recorded in the form of a volume grating, and thus, the signal light $L_s$ may be recorded in the holographic optical element HOE. The reference light may include at least one of red light, blue light, and green light.

The signal light may be recorded in the holographic optical element HOE while changing the incident angle of the reference light. Even through an incidence angle of the reference light changes, the incidence angle $\theta_s$ of the signal light $L_s$ may remain constant. In FIG. 3A, it is depicted that signal light is recorded with N reference lights according to various incident angles, but embodiment are not limited thereto.

Figure 3B:
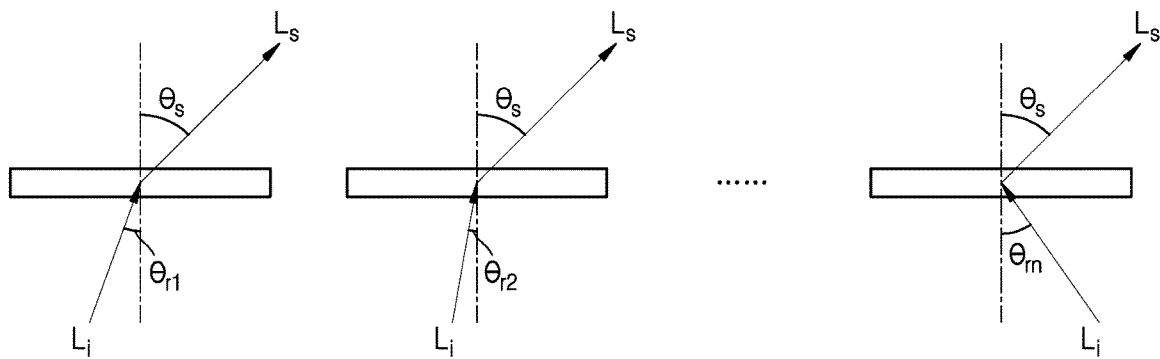
FIG. 3B is a reference diagram illustrating signal light output from a holographic optical element according to an incident of a leakage image according to an example embodiment.

FIG. 3B is a reference diagram illustrating signal light output from a holographic optical element HOE according to an incident of a leakage image according to an example embodiment.

As shown in FIG. 3B, a leakage image $L_i$ may be incident on the holographic optical element HOE at a first incident angle $\theta_{r1}$. The leakage image $L_i$ incident at a first incident angle $\theta_{r1}$ may have the same optical characteristics as the first reference light $L_{r1}$ incident at the first incident angle $\theta_{r1}$. The incident leakage image $L_i$ reacts to a signal light $L_s$ recorded together with the first reference light $L_{r1}$ among signal lights, and the holographic optical element HOE may output the signal light $L_s$. An output angle $\theta_s$ of the output signal light $L_s$ may be the same as the incident angle $\theta_s$ when the signal light $L_s$ is recorded, and an output direction of the output signal light $L_s$ may be the same as the incident direction when the signal light $L_s$ is recorded.

The leakage image $L_i$ may be incident on the holographic optical element HOE at the second incident angle $\theta_{r2}$. The leakage image $L_i$ incident at the second incident angle $\theta_{r2}$ may have the same optical characteristics as the second reference Light $L_{r2}$ incident at the second incident angle $\theta_{r2}$. The incident leakage image $L_i$ reacts to the signal light $L_s$ recorded together with the second reference light $L_{r2}$ among the signal lights, and the holographic optical element HOE may output the signal light $L_s$.

The output angles $\theta_s$ of the signal light $L_s$ output from the holographic optical element HOE may be the same regardless of the incident direction of the leakage image $L_i$. The output angle $\theta_s$ of the signal light $L_s$ may be an angle at which the signal light $L_s$ may be totally internally reflected in the second waveguide 134. Thus, the signal light $L_s$ is totally internally reflected in the second waveguide 134 regardless of the incident angle of the leakage image, the output of the leakage image to the outside may be reduced.

The signal light only reacts and outputs light having the same optical characteristics as the reference light when the signal light is recorded, but does not react to light having different optical characteristics. Accordingly, light incident from the outside does not react to the holographic optical element HOE, and may pass through the holographic optical element HOE.

FIGS. 3A and 3B illustrate a transmissive holographic optical element as the deflection element 132, but are not limited thereto. A reflective holographic optical element may also be used as the deflection element 132.

Figure 4:
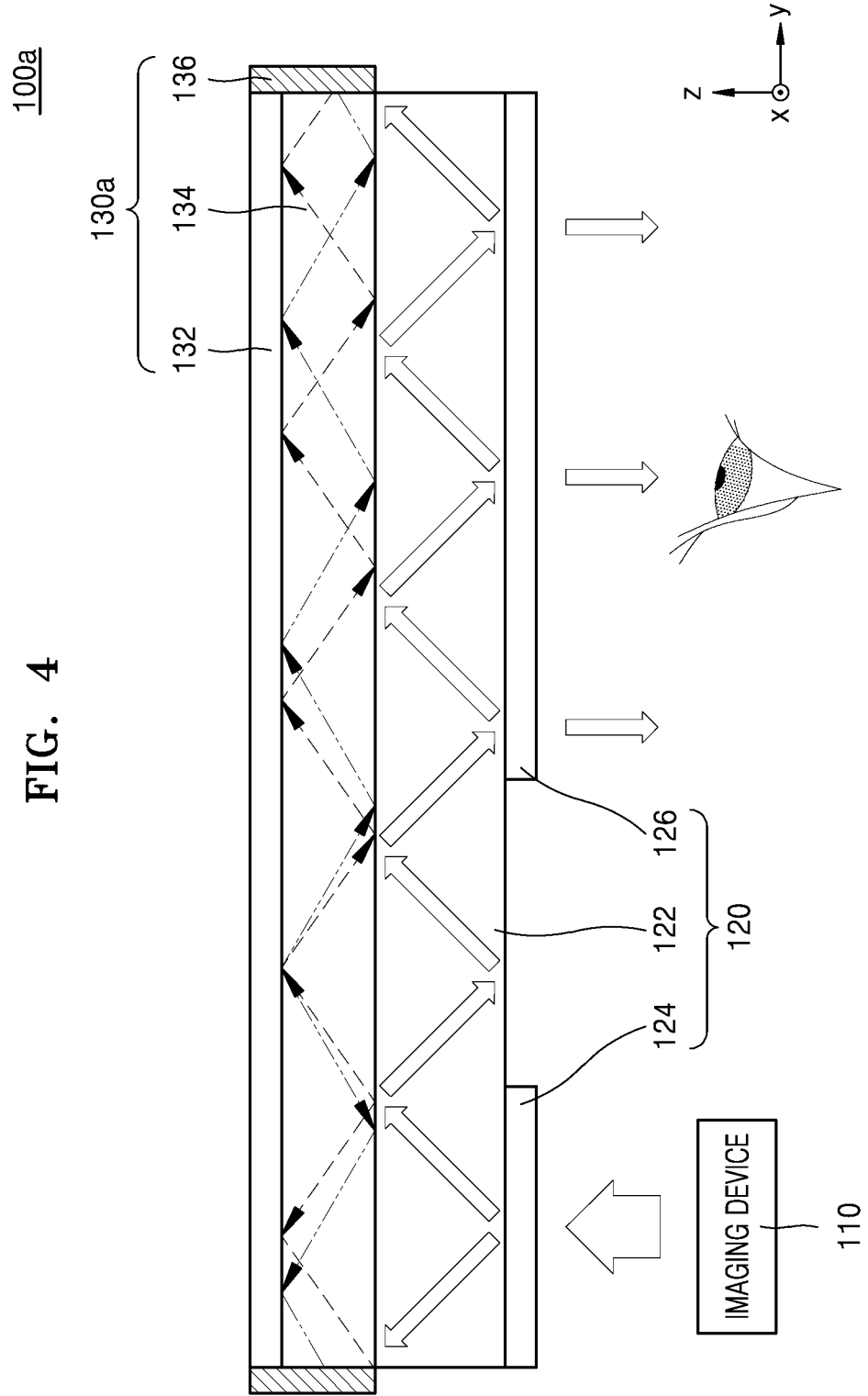
FIG. 4 is a diagram illustrating a display apparatus according to an example embodiment.

FIG. 4 is a diagram illustrating a display apparatus 100a according to an example embodiment. A leakage image reducer 130a of the display apparatus 100a of FIG. 4 may also include a second waveguide 134, a deflection element 132, and a light absorber 136. The second waveguide 134 may be arranged between the first waveguide 122 and the deflection element 132. The second waveguide 134 may have a refractive index less than or equal to the refractive index of the first waveguide 122, and the deflection element 132 may be of a reflective type.

Among images travelling in the first waveguide 122, a leakage image leaked through a surface of the first waveguide 122 without being totally internally reflected in the first waveguide 122 may exit the first waveguide 122 and enter the second waveguide 134. The leakage image may be refracted while incident on the second waveguide 134.

A part of the leakage image may be totally internally reflected in the second waveguide 134 and may move to an end of the second waveguide 134. In addition, the leakage image may be prevented from being output to the outside by being absorbed by the light absorber 136 arranged at the end of the second waveguide 134.

In addition, some other parts of the leakage image may not be totally internally reflected in the second waveguide 134 and may pass through a surface of the second waveguide 134 and exit the second waveguide 134. The deflection element 132 arranged on an outer surface of the second waveguide 134 may react to an incident leakage image that is not totally internally reflected in the second waveguide 134 to output deflected light that may be totally internally reflected in the second waveguide 134. The deflected light may travel in a length direction of the second waveguide 134 while being totally internally reflected in the second waveguide 134. In addition, the leakage image may be prevented from being output to the outside by being absorbed by the light absorber 136 arranged at the end of the second waveguide 134.

According to an example embodiment, the second waveguide 134 of FIG. 4 is disposed in contact with the first waveguide 122, and the second waveguide 134 may have a refractive index less than the refractive index of the first waveguide 122. The deflection element 132 may be manufactured to output deflected light only with respect to light that is not totally internally reflected in the second waveguide 134 among the leakage images. Thus, the amount of the volume grating of the deflection element 132 may be reduced.

The deflection element 132 may include both a transmissive type deflection element and a reflective type deflection element.

Figure 5:
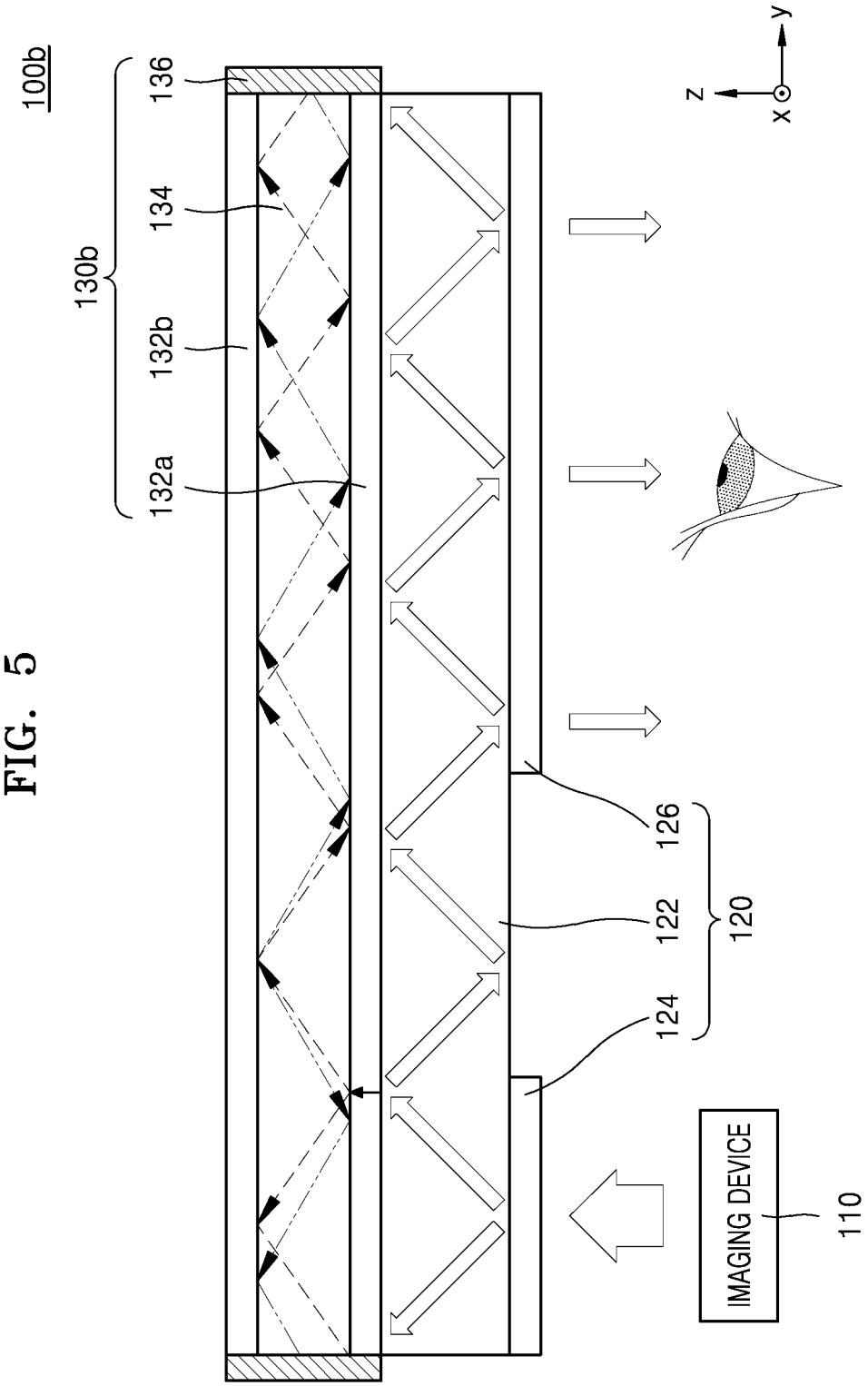
FIG. 5 is a diagram illustrating a display apparatus including a plurality of deflection elements according to an example embodiment.

FIG. 5 is a diagram illustrating a display apparatus 100b including a plurality of deflection elements according to an example embodiment. As shown in FIG. 5, the plurality of deflection elements may include first and second deflection elements 132a and 132b separated from each other with a second waveguide 134 therebetween. Accordingly, a leakage image leaked from the first waveguide 122 may be deflected by the first deflection element 132a and enter the second waveguide 134. When the first deflection element 132a is a holographic optical element, light deflected by the first deflection element 132a may be a signal light that has reacted to a leakage image among signal lights recorded in the holographic optical element. The deflected light may be absorbed by the light absorber 136 by travelling with total internal reflection in the second waveguide 134.

In addition, among the deflected light, light that is not totally internally reflected in the second waveguide 134 and has passed through a surface of the second waveguide 134 may be again deflected by the second deflection element 132b and re-incident to the second waveguide 134. The light deflected again by the second deflection element 132b may be totally internally reflected in the second waveguide 134 and proceed to be absorbed by the light absorber 136. The first and second deflection elements 132a and 132b may function as a double filter for a leakage image.

The leakage image reducer may not include a separate second waveguide 132 and may use the first waveguide 122.

Figure 6:
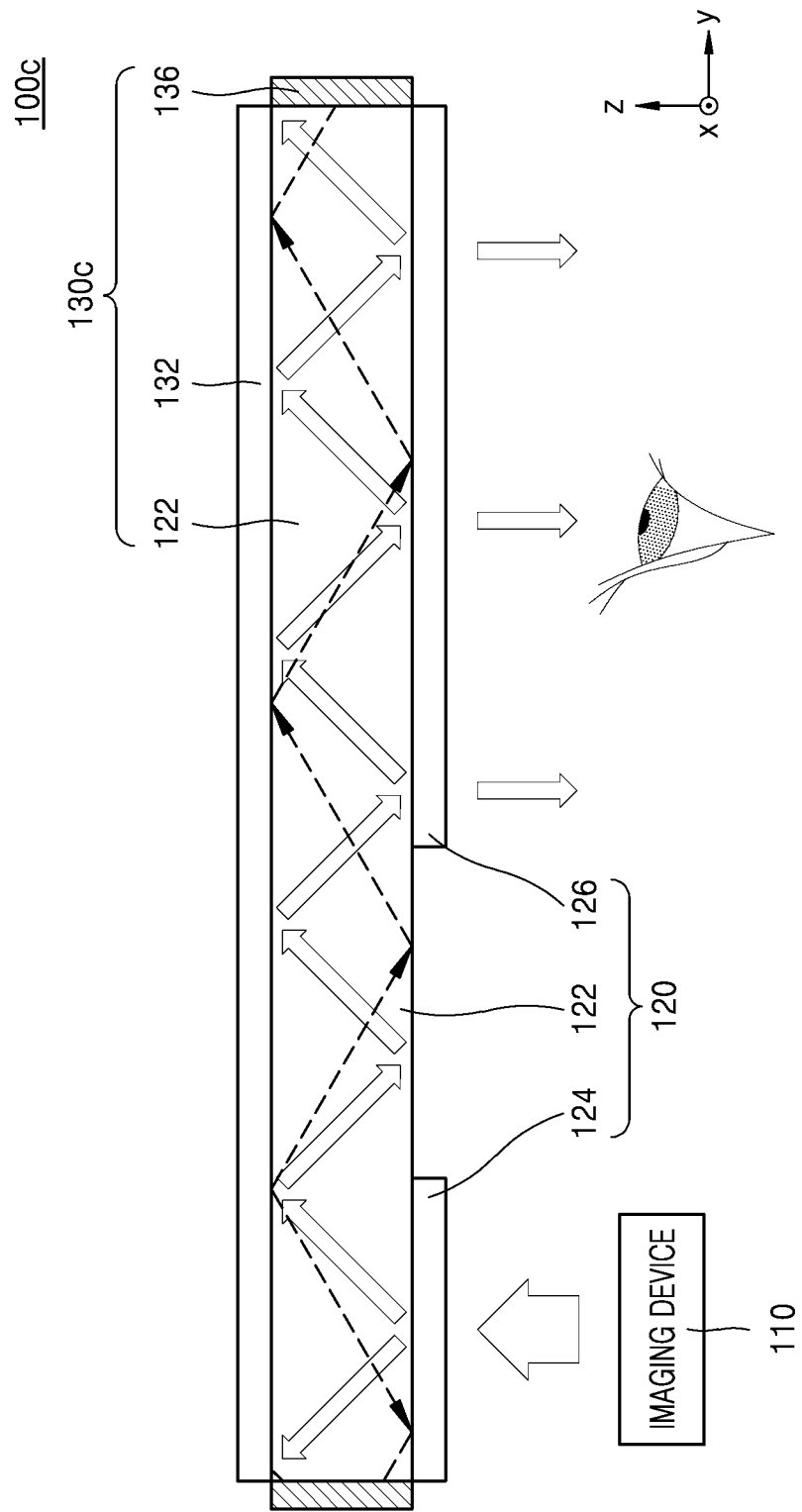
FIG. 6 is a diagram illustrating a display apparatus in which an optical coupler and a leakage image reducer share a waveguide according to an example embodiment.

FIG. 6 is a diagram illustrating a display apparatus 100c in which an optical coupler and a leakage image reducer 130c share a waveguide according to an example embodiment. Comparing FIGS. 1 and 6, the deflection element 132 may be arranged on an outer surface of the first waveguide 122. The deflection element 132 may be arranged on a region of the first waveguide 122 where the input coupler 124 and the output coupler 126 are not arranged. The light absorber 136 may be arranged at one end of both ends of the first waveguide 122.

The deflection element 132 may deflect a leakage image transmitted through the first waveguide 122 without total internal reflection. The deflected light may become re-incident onto the first waveguide 122, be totally internally reflected in the first waveguide 122, and proceed in a length direction of the first waveguide 122, and then, may be absorbed by the light absorber 136.

The leakage image reducer 130c may be configured in a plurality of leakage image reducers. For example, the leakage image reducer 130c may include a plurality of deflection elements that respond to each wavelength.

Figure 7:
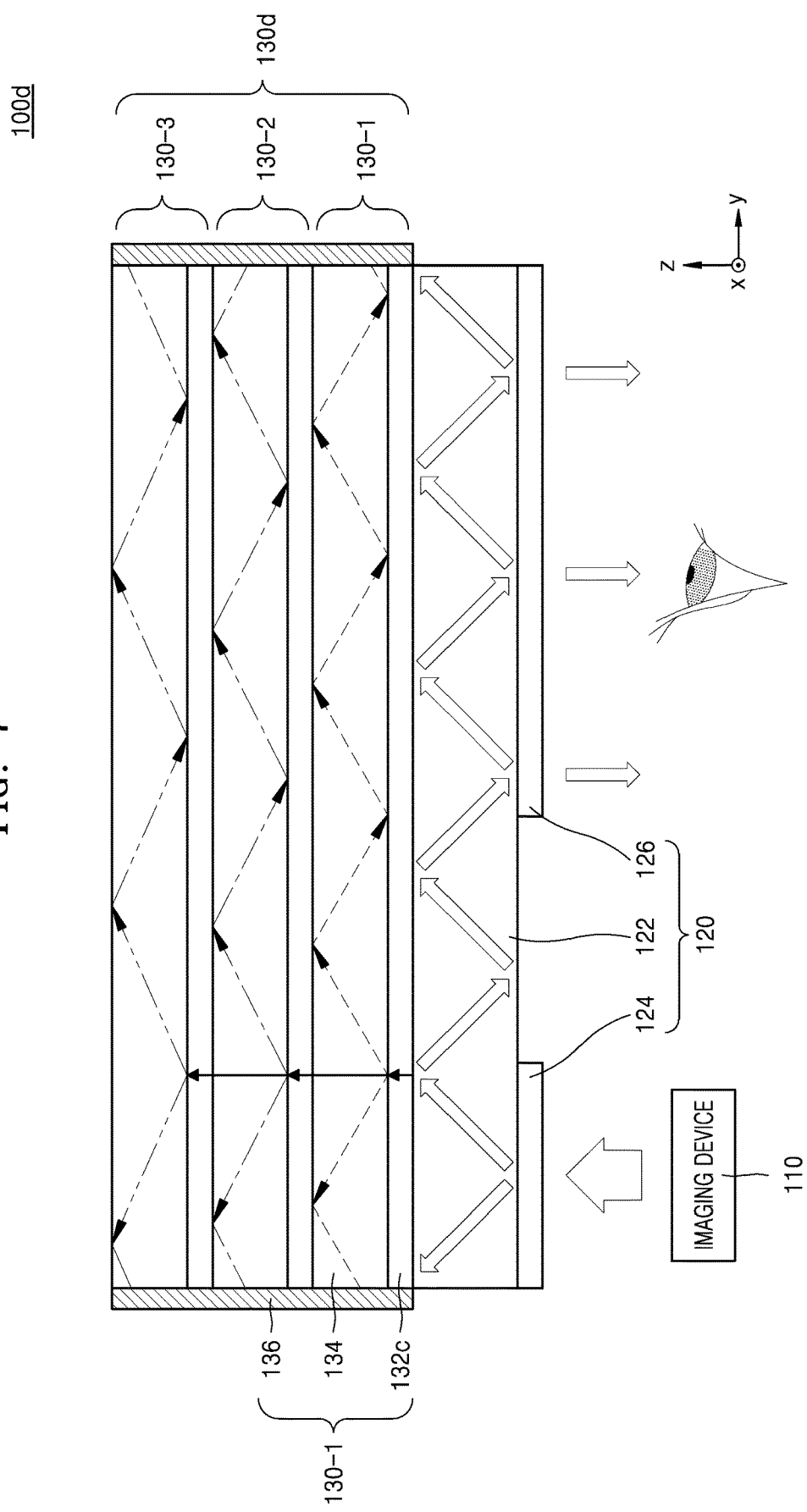
FIG. 7 is a diagram illustrating a display apparatus including a plurality of leakage image reducers according to an example embodiment.

FIG. 7 is a diagram illustrating a display apparatus 100d including a plurality of leakage image reducers 130d according to an embodiment. As shown in FIG. 7, the leakage image reducer 130d may include a first leakage image reducer 130-1 that reduces emission of light having a first optical characteristic among leakage images to the outside, a second leakage image reducer 130-2 that reduces emission of light having a second optical characteristic among leakage images to the outside, and a third leakage image reducer 130-3 that reduces emission of light having a third optical characteristic among leakage images to the outside. The light having the first optical characteristic may be red light, the light having the second optical characteristic may be green light, and the light having the third optical characteristic may be blue light. However, the disclosure is not limited thereto.

Each of the first to third leakage image reducers 130-1, 130-2 and 130-3 may include a deflection element 132 that outputs deflected light by reacting to light having a specific optical characteristic of a leakage image, a second waveguide 134 for proceeding light output from the deflection element 132 in one direction by totally internally reflecting the light, and a light absorber 136 for absorbing light traveling through the second waveguide 134.

Each of the first to third leakage image reducers 130-1, 130-2, and 130-3 prevents only leakage images having specific optical characteristics from being output to the outside, and thus, the efficiency of the deflection element 132 included in each of the first to third leakage image reducers 130-1, 130-2, and 130-3 may be increased.

According to the example embodiment illustrated in FIG. 7, the plurality of leakage image reducers 130-1, 130-2, and 130-3 respond to each wavelength, but embodiments are not limited thereto. For instance, according to another example embodiment, the plurality of leakage image reducers 130-1, 130-2, and 130-3 may respond to each incident angle of the leakage image.

According to the example embodiments illustrated in FIGS. 1, 4, 5, 6 and 7, the deflected light corresponding to a leakage image is absorbed by the light absorber 136, but embodiments are not limited thereto. For instance, according to another example embodiment, the leakage image may be incident on the first waveguide 122 again to become an image incident on the user's eyes.

Figure 8:
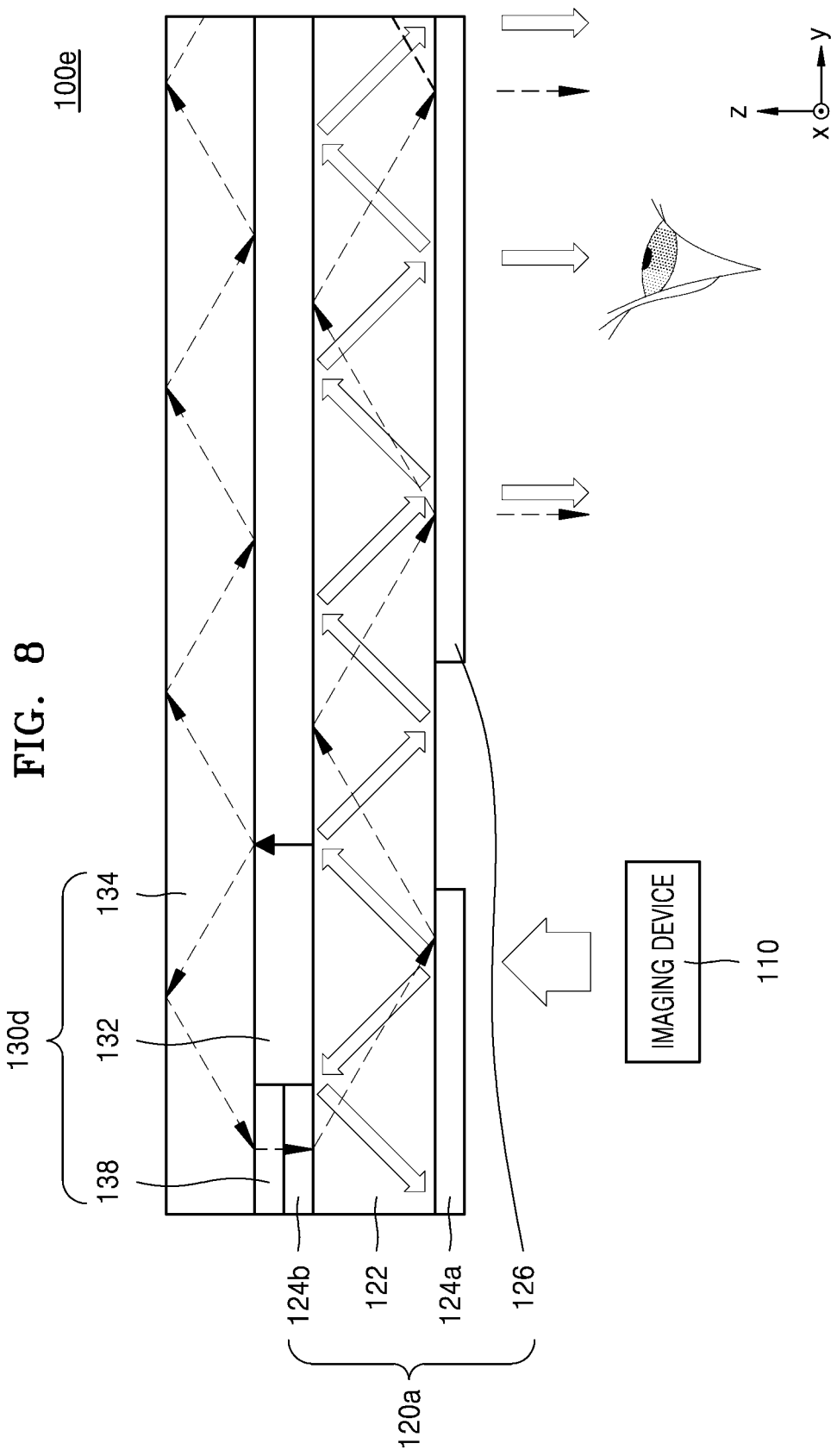
FIG. 8 is a diagram illustrating a display apparatus that reuses a leakage image according to an example embodiment.

FIG. 8 is a diagram illustrating a display apparatus 100e that reuses a leakage image according to an example embodiment. As shown in FIG. 8, an optical coupler 120a may include a first input coupler 124a for inputting an image provided from the imaging device 110 into a first waveguide 122 and a second input coupler 124b for inputting light output from a leakage image reducer 130d into the first waveguide 122. In addition, the first output coupler 126 that outputs an image propagating through the first waveguide 122 in a direction of the user's eyes may be arranged on the first waveguide 122, and the second output coupler 138 that outputs light proceeding from the second waveguide 134 to the optical coupler 120a may be arranged on the leakage image reducer 130d.

The first input coupler 124a may input an image output from the imaging device 110 into the first waveguide 122, and the image may be incident to the user's eyes through the first output coupler 126 while total internal reflection in the first waveguide 122.

Meanwhile, a leakage image, which is an image transmitted through the first waveguide 122 without total internal reflection among images, is incident on the deflection element 132, and the deflection element 132 may output deflected light corresponding to the leakage image to the second waveguide 134. After totally internally reflecting in the second waveguide 134, the deflected light may enter the user's eyes like an image by re-entering the first waveguide 122 through the second output coupler 138 and the second input coupler 124b.

In order to reuse the leakage image, the deflection element 132 may have a volume grating so as to output deflected light having the same image information as the leakage image. That is, the output deflected light that reacted to the leakage image has the same image information only in a different traveling direction from the leakage image, and thus, the deflected light may be referred to as a diffracted leakage image. As described above, because the leakage image is reused, the deterioration of brightness of an image due to the leakage image may be prevented while propagating through the first waveguide 122.

Although the deflection element 132 has been described by applying a holographic optical element, the embodiments are not limited thereto. For instance, the deflection element 132 may include a meta-material that forms a volume grating by arranging a nanostructure array including a plurality of nanostructures. The nanostructure array may have a subwavelength dimension. Here, the subwavelength refers to a dimension less than a wavelength of light to be used, that is, a leakage image.

Any one dimension constituting the shape of a nanostructure, for example, at least one of a thickness, a width, a length, or a gap between the nanostructures may have a dimension of a subwavelength. The meta-material may change the direction of light passing through the meta-material by controlling the phase change of light generated at an interface of the nanostructure. Optical characteristics, such as an operating wavelength of a meta-material may be controlled according to dimensions and arrangement method of a plurality of nanostructures constituting the meta-material.

The meta-material may include a dielectric. In the case of a metal-based meta-material, there is a large loss of light in a wavelength range of about 400 nm to about 700 nm, which is a visible light band. The dielectric meta-material may work well even in the visible light band without a significant loss. A dielectric constituting a nanostructure of the meta-material may include, for example, a dielectric material, such as silicon oxide (SiOx), silicon nitride (SiNx), titanium oxide (TiOx), aluminum oxide (AlOx), hafnium oxide (HfOx), etc., but is not limited thereto and may be variously changed.

Figure 9A:
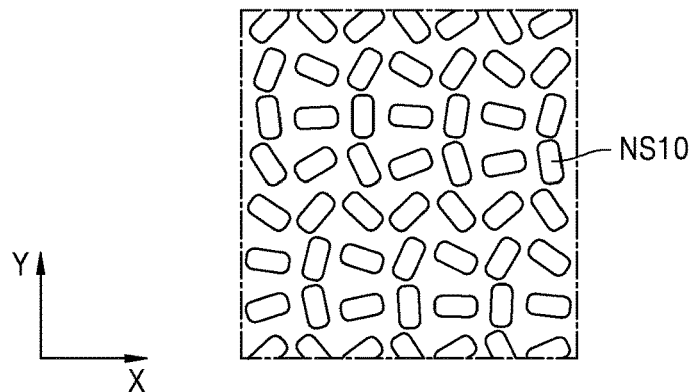
FIGS. 9A, 9B, and 9C are plan views each showing an example of a part of a meta-material according to an example embodiment.
Figure 9B:
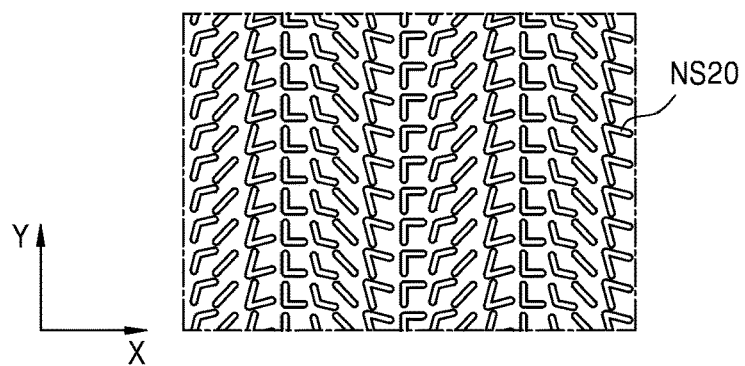
Figure 9C:
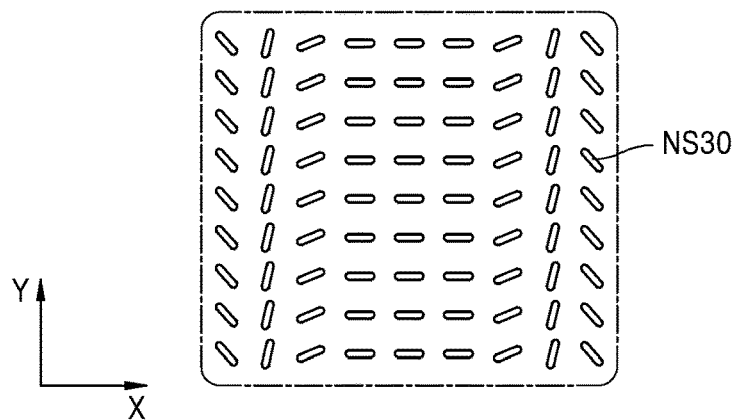

FIGS. 9A to 9C are plan views each showing an example of a part of a meta-material according to an example embodiment.

Referring to FIG. 9A, the meta-material may include a dielectric meta-material, and include a plurality of nanostructures NS10. The plurality of nanostructures NS10 may be two-dimensionally arranged. The arrangement direction of the nanostructures NS10 may be gradually changed from a first region to a second region of the meta-material. The travelling path of light passing through the meta-material may be changed by controlling the phase change of light generated in the plurality of nanostructures NS10.

The shape and arrangement method of the plurality of nanostructures NS10 constituting the meta-material may be variously changed. The variations are shown in FIGS. 9B and 9C. In FIG. 9B, a plurality of nanostructures NS20 are arranged, and, in FIG. 9C, a plurality of nanostructures NS30 are arranged. Characteristics of the meta-material may vary depending on the shape, dimensions, and arrangement method of the plurality of nanostructures constituting the meta-material. The nanostructures may have various shapes, such as a ring shape, a partial ring shape, an H shape, an I shape, and a U shape, etc. In addition, the meta-material may include a single nanostructure array or a plurality of stacked nanostructure arrays. When a leakage image is incident on the meta-material, the leakage image may be output by changing a traveling direction through refraction, diffraction, transmission, and the like.

Figure 10:
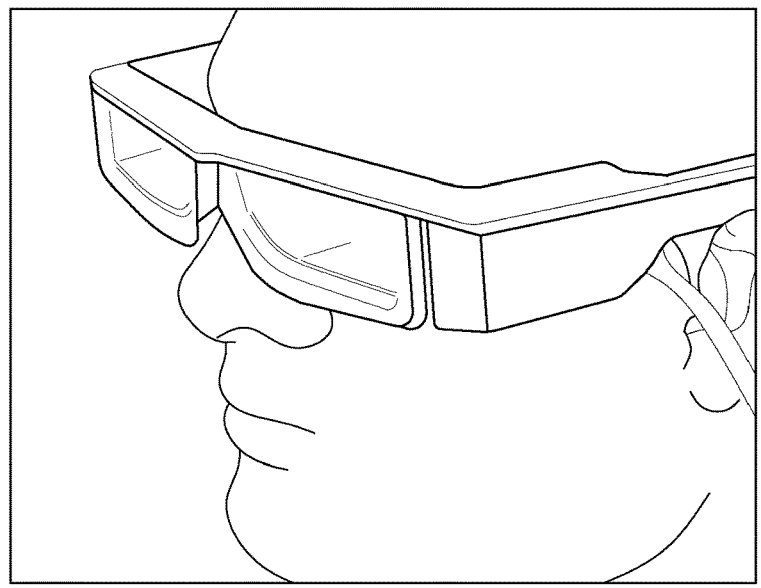
FIG. 10 is a diagram illustrating a type of a near-eye display apparatus according to an example embodiment.

The waveguide-type display apparatus described above may be a near-eye display apparatus. For example, the display apparatus may be applied to a head mounted display (HMD). In addition, the display apparatus 100 may be applied to a glasses-type display or a goggle-type display. FIG. 10 is a diagram illustrating a type of a near-eye display apparatus 100 according to an example embodiment.

The near-eye display apparatus may be operated in conjunction with (or connected to) a smart phone.

Figure 11:
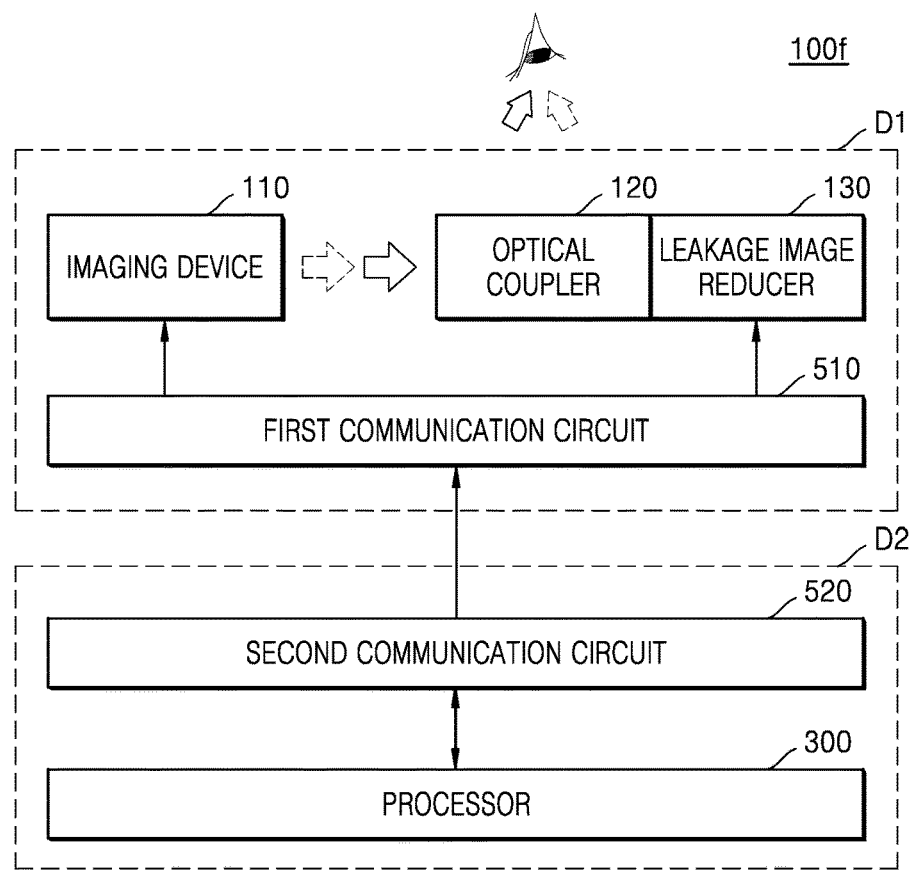
FIG. 11 is a block diagram illustrating a display apparatus according to an example embodiment.

FIG. 11 is a block diagram illustrating a display apparatus 100f according to an example embodiment. Referring to FIG. 11, the display apparatus 100f includes a first device D1 including an imaging device 110, an optical coupler 120, a leakage image reducer 130, and a first communication circuit 510, and a second device D2 including a second communication circuit 520 and a processor 300. The imaging device 110, the optical coupler 120, and the leakage image reducer 130 have been described above, and thus, detailed descriptions thereof will be omitted.

The first device D1 may be implemented as a wearable apparatus, for example, a HMD, and the second device D2 may be an electronic apparatus separate from the wearable apparatus, for example, a mobile phone or a computer.

The first and second communication circuits 510 and 520 may provide a control command of the processor 300 to the imaging device 110. The first and second communication circuits 510 and 520 may include a short-range wireless communication circuit, a mobile communication circuit, etc. According to an example embodiment, the first and second communication circuits 510 and 520 may provide a control command of the processor 300 to the leakage image reducer 130. For example, the processor 300 may output control command to change characteristics of the meta-material in the deflection element 132 of the leakage image reducer 130.

A method of controlling the imaging device 110 by the processor 300 may be implemented as an S/W program including instructions stored in a computer-readable storage media. According to an example embodiment, the storage media may be a memory or a storage device. The computer, as an apparatus capable of calling a stored instruction from a storage medium and operating according to the disclosed embodiments according to the called instruction, may include a display apparatus according to the disclosed embodiments.

Although the example embodiments of a waveguide type display have been described in detail with reference to accompanying drawings, in which example embodiments of the disclosure are shown, to facilitate understanding of the inventive concept. However, it will be understood by those skilled in the art that various changes in form and details may be made therein without departing from the spirit and scope of the inventive concept. Accordingly, the scope of the inventive concept is defined not by the detailed description of the invention but by the appended claims.

According to the disclosure, it is possible to reduce the output of an image leaked from the waveguide to the outside.

It should be understood that example embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. A waveguide type display apparatus comprising:
    a first waveguide comprising a front surface and a rear surface;
    a first coupler provided on the front surface of the first waveguide and configured to input light corresponding to an image into the first waveguide through the front surface of the first waveguide;
    a second coupler provided on the front surface of the first waveguide and configured to output the light propagating through the first waveguide to outside of the first waveguide; and
    an optical element provided on entirety of the rear surface of the first waveguide and comprising a volume grating configured to reduce leakage light from being emitted to an outside through the rear surface of the first waveguide, the leakage light being light that passes through the rear surface of the first waveguide without total internal reflection, among the light propagating inside the first waveguide.

2. The waveguide type display apparatus of claim 1, wherein the optical element is further configured to transmit light incident from a real environment.

3. The waveguide type display apparatus of claim 1, wherein the optical element is provided on a first region of the first waveguide that is different from a second region on which the first coupler is provided and a third region on which the second coupler is provided.

4. The waveguide type display apparatus of claim 1, wherein the leakage light has a diffraction order greater than or equal to 2 and the leakage light is generated by diffraction by at least one of the first coupler and the second coupler of the light propagating through the first waveguide.

5. The waveguide type display apparatus of claim 1, wherein the optical element comprises a deflection element configured to deflect light at an deflection angle greater than an incident angle of the leakage light by at least a portion of the volume grating based on the leakage light being incident on the volume grating.

6. The waveguide type display apparatus of claim 5, wherein the optical element further comprises a second waveguide provided parallel to the first waveguide, and
    wherein light deflected from the deflection element is totally internally reflected and propagated in the second waveguide.

7. The waveguide type display apparatus of claim 6, wherein the deflection element is provided between the first waveguide and the second waveguide.

8. The waveguide type display apparatus of claim 7, wherein the deflection element has a first refractive index that is less than a second refractive index of the first waveguide and less than a third refractive index of the second waveguide.

9. The waveguide type display apparatus of claim 6, wherein the first waveguide, the second waveguide, and the deflection element are sequentially arranged.

10. The waveguide type display apparatus of claim 6, wherein the deflection element comprises a first deflection element and a second deflection element, and
    wherein the second waveguide is provided between the first deflection element and the second deflection element.

11. The waveguide type display apparatus of claim 6, wherein the optical element further comprises a light absorber provided on the second waveguide.

12. The waveguide type display apparatus of claim 11, wherein the light absorber has an absorbance of about 80% or more.

13. The waveguide type display apparatus of claim 11, wherein the light absorber is provided on at least one end of the second waveguide.

14. The waveguide type display apparatus of claim 13, further comprising an imaging device configured to provide the image to the first coupler.

15. The waveguide type display apparatus of claim 13, wherein the waveguide type display apparatus is a near-eye display apparatus.

16. The waveguide type display apparatus of claim 5, wherein light deflected by the deflection element enters and propagates in the first waveguide by total internal reflection.

17. The waveguide type display apparatus of claim 16, wherein the optical element further comprises a light absorber provided on the first waveguide.

18. The waveguide type display apparatus of claim 5, wherein the deflection element comprises a holographic optical element in which the volume grating is formed by interference between reference light and signal light, and
    wherein the deflection element is configured to output the signal light that reacted to the leakage light, among a plurality of signal light recorded in the deflection element.

19. The waveguide type display apparatus of claim 5, wherein the deflection element comprises a meta-material in which the volume grating is formed as a nanostructure array having a dimension less than a wavelength of the leakage light and which changes a direction of the leakage light.

20. The waveguide type display apparatus of claim 1, wherein the optical element comprises:

a first optical element configured to reduce leakage of light having a first optical characteristic among the leakage light to the outside; and a second optical element configured to reduce leakage of light having a second optical characteristic among the leakage light to the outside, and wherein the optical element is further configured to reduce leakage of light having a third optical characteristic among the leakage light to the outside.

21. The waveguide type display apparatus of claim 20, wherein the first optical characteristic, the second optical characteristic, and the third optical characteristic correspond to different wavelengths.

22. The waveguide type display apparatus of claim 20, wherein the light having the first optical characteristic is red light, the light having the second optical characteristic is green light, and the light having the third optical characteristic is blue light.

23. The waveguide type display apparatus of claim 1, further comprising a third coupler provided on the optical element, wherein the third coupler is configured to make the leakage light to be reincident onto the first waveguide.

\* \* \* \* \*